(12) United States Patent
Rüffer et al.

(10) Patent No.: US 8,702,180 B2
(45) Date of Patent: Apr. 22, 2014

(54) MOTOR/PUMP ASSEMBLY

(75) Inventors: Manfred Rüffer, Sulzbach (DE);
Wolfgang Ritter, Oberursel (DE);
Karlheinz Seitz, Lorsch (DE); Stefan Drumm, Saulheim (DE); Jose Gonzalez, Bad Oeynhausen (DE);
Michael Jürging, Kelkheim (DE);
Daniela Gude, Schmihen (DE); Oliver Volkering, Frankfurt (DE); Jürgen Schonlau, Walluf (DE)

(73) Assignee: Continental Teves AG & Co. oHG (DE)

( * ) Notice: Subject to any disclaimer, the term of this patent is extended or adjusted under 35 U.S.C. 154(b) by 1245 days.

(21) Appl. No.: 12/278,647

(22) PCT Filed: Jan. 30, 2007

(86) PCT No.: PCT/EP2007/050913
§ 371 (c)(1),
(2), (4) Date: Sep. 24, 2009

(87) PCT Pub. No.: WO2007/090764
PCT Pub. Date: Aug. 16, 2007

(65) Prior Publication Data
US 2010/0045096 A1 Feb. 25, 2010

(30) Foreign Application Priority Data

Feb. 10, 2006 (DE) .......... 10 2006 006 493
Jan. 29, 2007 (DE) .......... 10 2007 005 223

(51) Int. Cl.
*B60T 13/16* (2006.01)
(52) U.S. Cl.
USPC ............................ 303/10; 417/44.2
(58) Field of Classification Search
USPC ............ 303/119.3, DIG. 10, 116.4, 10; 417/44.2, 413.1, 312
See application file for complete search history.

(56) References Cited

U.S. PATENT DOCUMENTS

| | | | |
|---|---|---|---|
| 3,947,156 A | 3/1976 | Becker | |
| 5,961,189 A | 10/1999 | Lutteke et al. | |
| 2010/0045096 A1* | 2/2010 | Schonlau et al. | 303/10 |

FOREIGN PATENT DOCUMENTS

| | | |
|---|---|---|
| DE | 275455 | 5/1913 |
| DE | 2211096 | 9/1973 |
| DE | 2212322 | 9/1973 |
| DE | 3513218 A1 | 1/1986 |
| DE | 3529978 A1 | 3/1987 |
| DE | 19904350 A1 | 8/2000 |
| DE | 102006060645 A1 * | 8/2007 |
| EP | 0 743 452 A1 | 11/1996 |
| GB | 1 354 037 | 5/1974 |
| WO | WO 95/00187 | 1/1995 |
| WO | WO 95/31362 | 11/1995 |

* cited by examiner

Primary Examiner — Melanie Torres Williams
(74) Attorney, Agent, or Firm — RatnerPrestia (57) ABSTRACT

A motor and pump assembly for providing pressure to a brake actuating device of a motor vehicle brake system is described herein. The assembly comprises an electric motor and a double diaphragm pump. The pump includes a pump housing, two opposed working diaphragms, and crank drives each being coupled between the electric motor and a respective diaphragm for moving the diaphragm. A working chamber is defined between the pump housing and a working chamber cover. Each working chamber including an inlet channel, an inlet valve associated with the inlet channel, an outlet channel, and an outlet valve associated with the outlet channel, wherein the outlet channels are defined in the covers of the working chamber and in the pump housing to direct air displaced from the working chambers into an inside space of the pump housing. An air outlet unit is provided for exhausting the air from the inside space.

45 Claims, 6 Drawing Sheets

MOTOR/PUMP ASSEMBLY

CROSS-REFERENCE TO RELATED APPLICATIONS

This application is the U.S. national phase application of PCT International Application No. PCT/EP2007/050913, filed Jan. 30, 2007, which claims priority to German Patent Application No. DE0102006006493.3, filed Feb. 10, 2006 and German Patent Application No. DE102007005223.7, filed Jan. 29, 2007, the contents of such applications being incorporated by reference herein in their entirety.

BACKGROUND OF THE INVENTION

1. Field of the Invention

The present invention relates to a motor-and-pump assembly, in particular for providing pressure for a brake actuating device of a motor vehicle brake system.

2. Description of the Related Art

To make vacuum available for a pneumatic brake booster whose interior is subdivided into at least one vacuum chamber and one working chamber, vacuum pumps are typically employed which aspirate residual air out of the vacuum chamber and exhaust it into the atmosphere. Vane-type pumps or wing pumps are typically used for this purpose in the automotive industry. Due to their principle, these pumps suffer from much friction and need lubrication in order to reach an acceptable useful life. Vacuum pumps with vanes which are driven by the internal combustion engine of the motor vehicle are therefore connected to the oil circulation of the internal combustion engine. Nevertheless, an appreciable portion of the power output by the internal combustion engine is required for driving a pump of this type. And this is even necessary when the vacuum in the chamber to be evacuated is already fully developed. Therefore, it is appropriate to operate the vacuum pump with electric energy and to switch it on only when the absolute pressure in the vacuum chamber rises in excess of a predetermined value.

Furthermore, it is possible in vehicles with electric or hybrid drive that the vacuum pump is not operated at all or is not operated temporarily by the internal combustion engine. For this reason, electrically driven vacuum pumps are used in these vehicles.

It may involve great expenditure to equip such an electrically driven pump with a lubricant cycle or to connect it to such a cycle. Therefore, only dry running vacuum pumps lend themselves to being used in motor vehicles with brake systems equipped with an electrically driven vacuum pump. To this end, the self-lubricating material graphite is employed in vane-type pumps, and the vanes are made from this material with the necessary precision and requiring great expenditure. Therefore, efforts are directed to the use of a diaphragm pump for the electric supply of brake vacuum.

Diaphragm pumps are generally known. Document DE 35 29 978 A1 discloses a motor-and-pump assembly comprising a double diaphragm pump with a rotating eccentric shaft which is driven by an electric motor.

The automotive industry places very high demands on the acoustic comfort of the motor vehicle components and requests from its suppliers robust, long-lived pumps with very low noise emissions. These requests cannot be satisfied by the prior art diaphragm pumps due to vibrations or necessitate great expenditure in sound absorbing measures, respectively.

It is an object of the invention to provide a motor-and-pump assembly which comprises a dry-running pump and satisfies the high demands with respect to the acoustic comfort.

Another objective of the invention is directed to improving the motor-and-pump assembly in terms of its pump effect.

SUMMARY OF THE INVENTION

According to one aspect of the invention, the foregoing object is achieved in that the outlet channels in the covers of the working chamber and in the pump housing are arranged in such a fashion that air displaced from the working chambers is routed into an inside space of the pump housing, and that an air outlet unit is provided which allows exhausting the air from the inside space at low noise. The inside space, also referred to as crank chamber, thus serves as a sound absorbing space since the exhausted air is not routed directly into the atmosphere, thus preventing the development of exhaust noise.

Preferably, the air outlet unit includes means for absorbing sound. This allows reducing airborne sound when the air exits from the air outlet unit.

According to a favorable embodiment of the invention, the air outlet unit closes an aperture of the wall of the pump housing in a sealing manner. Thus, the aperture can fulfill the function of am mounting window during the mounting of the motor-and-pump assembly, whereby mounting can be considerably facilitated.

Another way of facilitating the installation is achieved according to a favorable improvement of the invention in that the air outlet unit comprises a filter housing, a filter, an air outlet cover, an air outlet closing cap as well as a valve member and is provided as a subassembly which can be pre-assembled.

Return flow of the expelled air and the ingress of fluid or gaseous substances into the air outlet unit are preferably prevented because the air outlet cover, the air outlet closing cap and the valve member form a non-return valve. Alternatively, the air outlet cover, the air outlet closing cap and the valve member form the non-return valve.

The subassembly is produced in a captive way according to a favorable embodiment because the filter housing is riveted to the air outlet cover.

Preferably, the air outlet cover can be fastened to the wall by means of screw elements, whereby a sealed attachment is rendered possible in a simple way.

According to a favorable improvement of the invention, the two inlet channels are interconnected through channels designed in the pump housing and have one common port. A second port is unnecessary, with the result that the mounting space of the motor-and-pump assembly can be optimized.

The port preferably includes means for fastening a hose. For example, it is feasible according to a favorable embodiment that the port is designed as an air intake fitting.

According to another favorable embodiment of a motor-and-pump assembly, an adapter is provided which is fastened in a sealing manner in the port and includes an adapter exit, with the adapter exit including means for attaching a hose. This allows adapting the adapter to individual requests of the customers without requiring modification of the pump housing.

Preferably, the adapter can be positioned in the connection by means of locking engagement, or so as to be rotatable by means of pin-shaped elements, the said pin-shaped elements engaging into an outside groove of the adapter.

In order to achieve a motor-and-pump assembly for most various installation conditions, the pump housing according to a favorable embodiment of the invention includes two opposed ports, and one port is closed. For this purpose, one of the ports can be tightly closed by means of a plug, or one of the connections remains closed during the manufacture and will only be opened by boring, for example, in case of need.

Preferably, the pump housing can be made of plastics or aluminum, and the pump housing made of plastics allows achieving low weight of the motor-and-pump assembly. On the other hand, a pump housing of aluminum permits good heat dissipation from the motor, thereby prolonging the useful life of the motor.

Likewise the cover of the working chamber can be made of plastics or aluminum, whereby the manufacture of the working chamber cover can be simplified.

Mounting is simplified according to a favorable embodiment because the inlet valve and the outlet valve of a working chamber are provided in each case as a valve unit that can be pre-assembled. It is possible in this context to achieve further simplification of the mounting because the pre-assembled valve unit can be integrated into the working chamber cover and together with it forms a ready-to-install working chamber cover unit.

According to a favorable design of the invention, the working chamber cover includes an upper lid and a lower lid which are interconnected in a sealing fashion, with the valves being provided between upper lid and lower lid. This allows mounting the valves in a simple way.

Preferably, the upper lid is welded or screwed to the lower lid. As a result, the upper lid can be centered simultaneously on the lower lid without further means.

According to a favorable embodiment of the invention, a straightforward manufacture of the working chamber cover is achieved in that the inlet channel is designed in the upper lid and the outlet channel is provided between upper lid and lower lid.

Optimal utilization of the cross-sectional area of orifice of the inlet valve is preferably obtained by the inlet channel in the area of the inlet valve splitting into several single channels being arranged circularly around a center line of the inlet valve.

Preferably, the inlet valve and the outlet valve are arranged crossly to the axes of symmetry of the pump, thereby rendering it possible to design the working chamber cover in a way that optimizes mounting space. The valves are preferably provided as plate valves with valve disc.

To facilitate the assembly of the valve discs, positioning pins are provided in the lower lid in order to position valve discs according to a favorable improvement of the invention.

The lower lid includes working chamber cover openings being preferably allocated to the inlet valve and the outlet valve, and the working chamber cover openings are arranged in a circular way around the center line of the valves. As a result, the so-called detrimental volume can be minimized as much as possible without reducing the volume penetrating the working chamber cover openings.

According to a favorable improvement of the invention, the inlet and outlet channels are arranged in the pump housing in such a fashion that the two working chamber covers have an identical design. It is thus possible to provide the working chamber covers with an equal configuration on both sides of the pump, and keeping two different working chamber covers on stock is not necessary.

Preferably, spacing adjustment means are provided in order to adjust the distance between the working chamber covers and the working diaphragm, thereby allowing manufacturing tolerances and mounting tolerances to be compensated.

The spacing adjustment means can be provided in a simple fashion when, according to a favorable embodiment, the spacing adjustment means are provided by an adjustable connection between connecting rod and a tappet linked to the working diaphragm.

Another favorable embodiment of the invention arranges for spacing adjustment means in order to adjust the distance between the working chamber covers and the pump housing. As a result, it is likewise possible to compensate manufacturing tolerances as well as mounting tolerances. For example, the distance can be adjusted by means of a welded joint, or it occurs by means of a screw coupling between working chamber cover and pump housing.

The crank drive is centered within the pump housing in an advantageous way in that a motor shaft of the electric motor is mounted in a first bearing arranged in the motor and in a second bearing, with the second bearing being accommodated in part in a motor housing and in part in the pump housing, and in that a motor shaft end projects into the pump housing. This obviates the need for an additional mounting support of the motor shaft in the pump housing.

The number of single parts is preferably reduced because the crank drive (eccentrics and connecting rods) is arranged on the motor shaft. This eliminates the need for an additional eccentric shaft.

According to a favorable embodiment, it is however also feasible that the crank drive (eccentrics and connecting rods) is arranged on an eccentric shaft, which is connected to the motor shaft by means of a screw coupling, with center lines of the motor shaft and the eccentric shaft being in alignment with each other.

In order to safeguard smooth running of the motor-and-pump assembly, it is preferably provided that central points of the eccentrics are arranged diametrically in relation to a center line of the motor shaft or the eccentric shaft. As a result, the reaction forces of the oscillating masses can almost be balanced.

Another component reduction can be achieved in that the eccentrics are designed in one piece as a double eccentric.

According to a favorable improvement of the motor-and-pump assembly, the pump housing and the working chamber covers include means for the defined positioning of the working chamber covers on the pump housing for the improved mounting of the working chamber cover.

Preferably, the motor-and-pump assembly is actuated by way of an electronic control unit depending on a signal of a sensor, which detects a difference in pressure between the vacuum chamber and the working chamber or an absolute pressure in the vacuum chamber of the brake booster.

The connecting rods can be made of plastics in a weight-optimized way when the connecting rods include injection-molded prop rings in the area of a connecting rod eye in order to stabilize ball bearings according to a preferred embodiment. In a favorable alternative, the connecting rods include a slot in the area of the connecting rod eye, allowing the ball bearings to be resiliently enclosed. It is thus unnecessary to injection-mold the mentioned prop rings.

Further features, advantages and possible applications of the invention can be taken from the following description of several embodiments and by way of the accompanying drawings.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
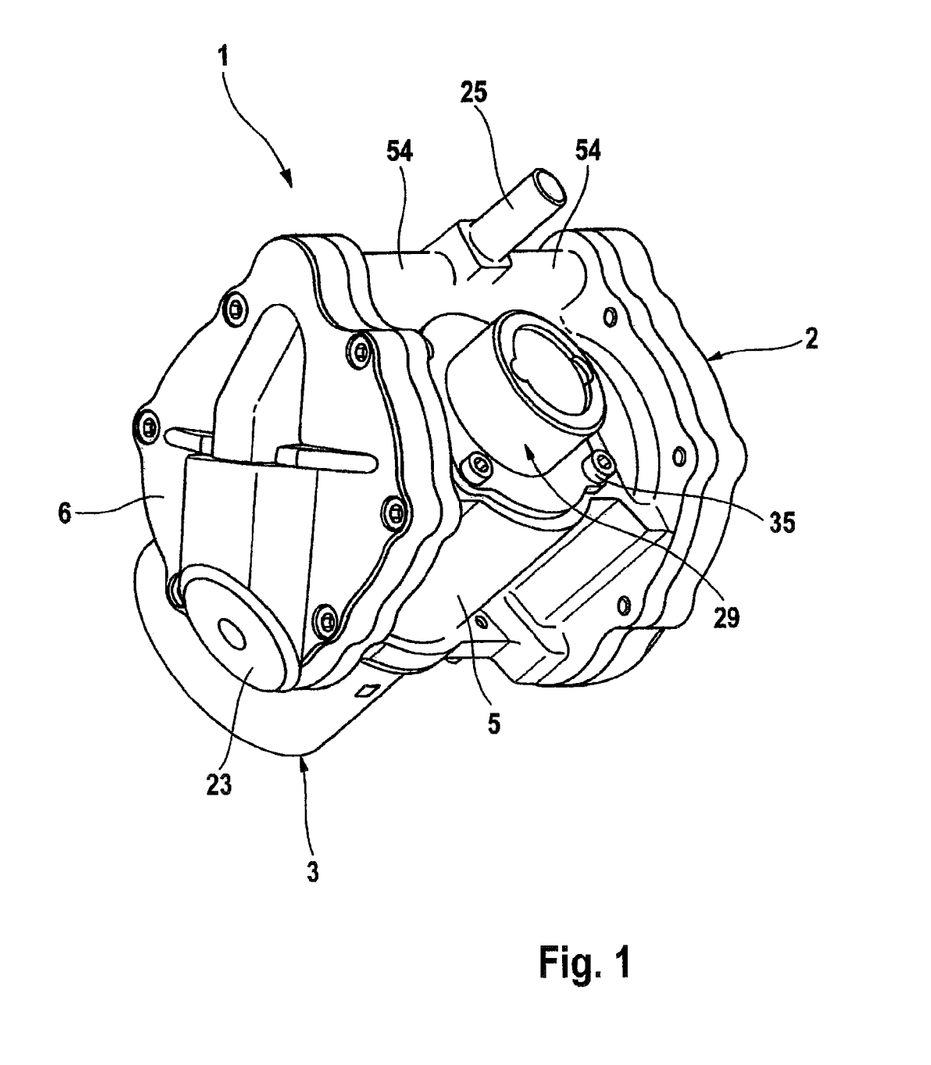
FIG. 1 is a three-dimensional view of a first embodiment of a motor-and-pump assembly of the invention.

FIG. 1 shows a three-dimensional view of a first embodiment of a motor-and-pump assembly 1 of the invention which is provided, for example, for supplying vacuum for a brake actuating device of a motor vehicle brake system with a pneumatic brake booster (not shown). The motor-and-pump assembly 1 comprises a pump 2 with a pump housing 5 and an electric motor 3 which drives the pump 2 and can e.g. be designed as a direct-current motor.

Figure 2:
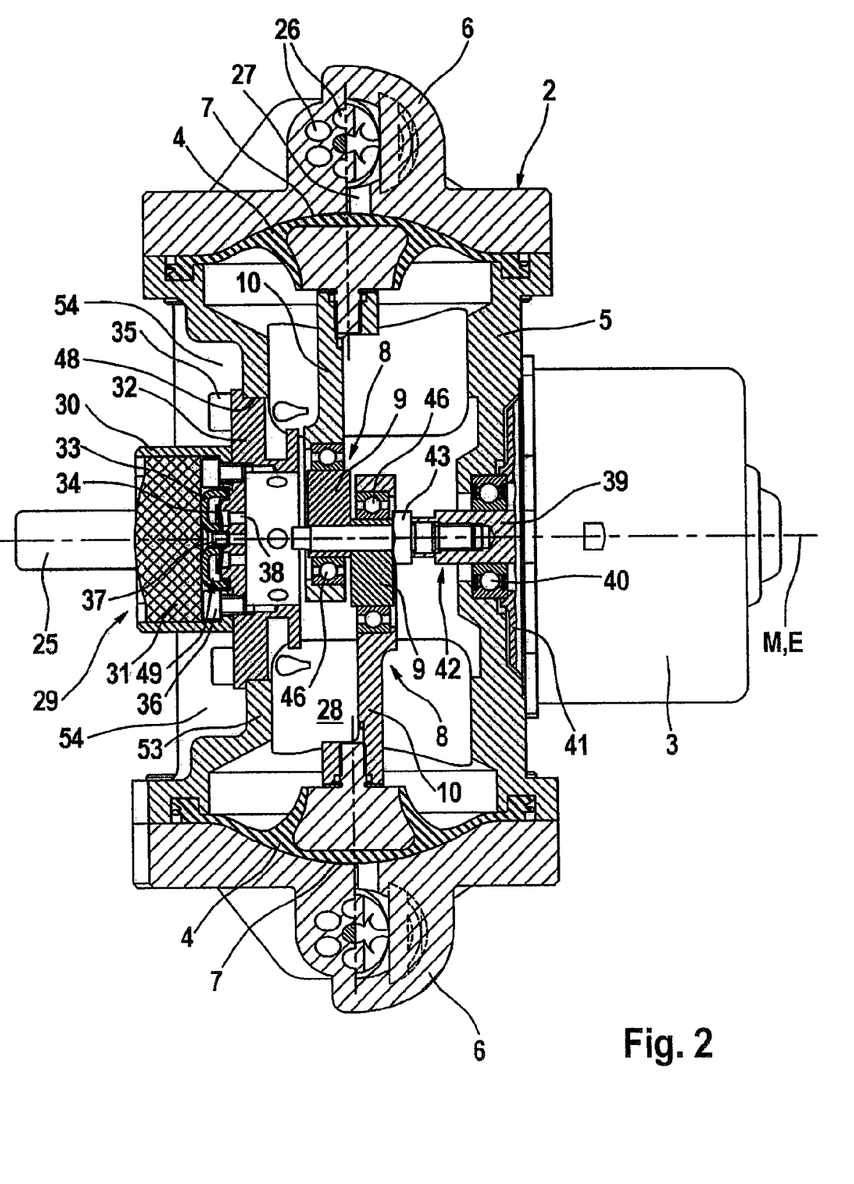
FIG. 2 shows the motor-and-pump assembly according to FIG. 1 in a longitudinal cross-section taken through a first plane.

As can be taken from FIG. 2 in particular which shows the motor-and-pump assembly in the longitudinal cross-section taken through a first plane, pump 2 is designed as a double diaphragm pump with two opposite working diaphragms 4 being compressed in each case between the pump housing 5 and a working chamber cover 6, thereby delimiting a working chamber 7. The working diaphragms 4 are movable in an opposite direction by means of a crank drive 8, which comprises an eccentric 9 and a connecting rod 10 per working diaphragm 4.

Figure 3:
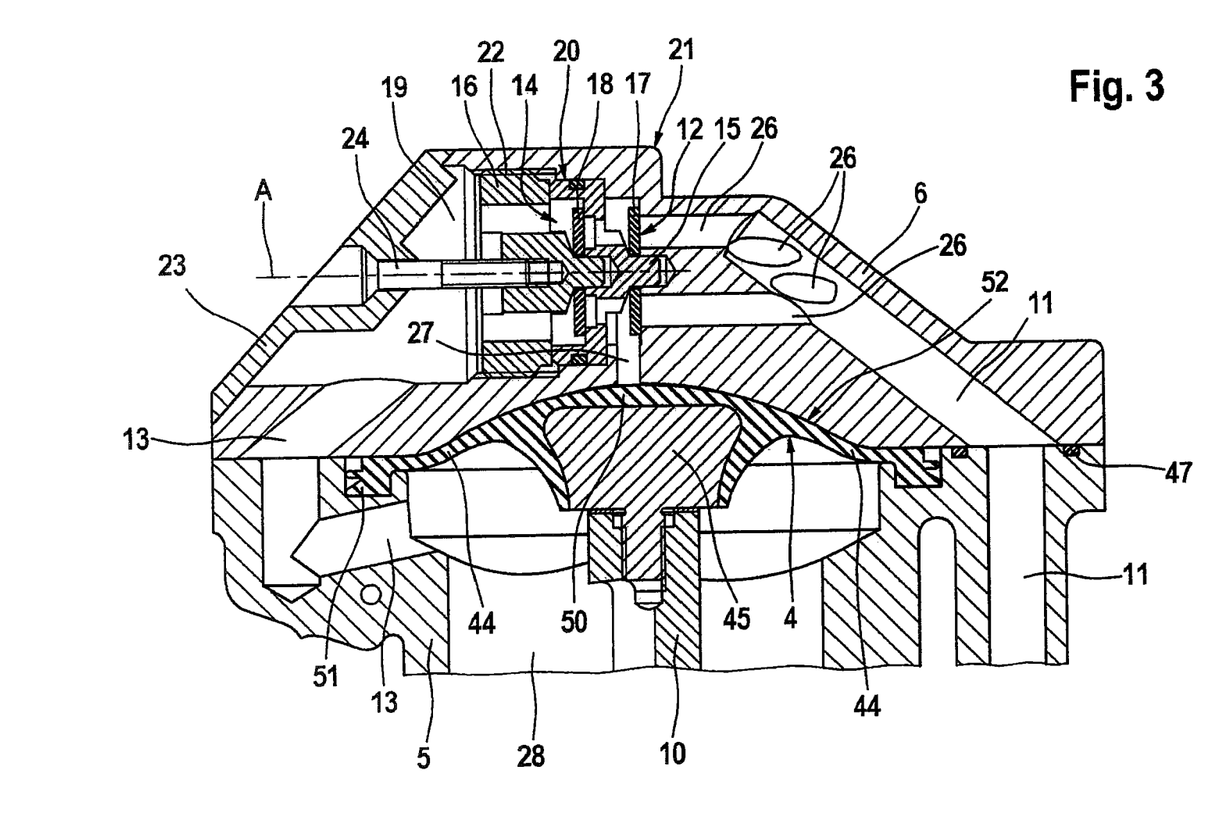
FIG. 3 shows a partial view of the motor-and-pump assembly according to FIG. 1 in a longitudinal cross-section taken through a second plane.

As can be seen in FIG. 3, which illustrates a partial view of the motor-and-pump assembly 1 in a cross-section taken through a second plane, each one inlet channel 11 with an inlet valve 12 as well as an outlet channel 13 with an outlet valve 14 is associated with each working chamber 7. The inlet valve 12 and the outlet valve 14 are designed as a non-return valve and comprise in each case a valve accommodation 15, 16 and a valve disc 17, 18, with the inlet valve and the outlet valve 12, 14 being provided as a valve unit 20 which can be pre-assembled and can be mounted into a recess 19 of the working chamber cover 6 in order to provide, in turn, a ready-to-mount working chamber cover unit 21. Thus, the valve unit 20 and the working chamber cover unit 21 can be pre-assembled as a subassembly, thereby facilitating the mounting of the motor-and-pump assembly 1.

The valve accommodation 15 of the inlet valve 12 includes a pin-shaped portion which projects into a corresponding recess in the working chamber cover 6 after the valve unit 20 has been mounted into the working chamber cover 6. This positioning renders it possible to facilitate the mounting of the valve unit 20. As can be taken from FIG. 3 in addition, the valve accommodation 16 of the outlet valve 14 also has a pin-shaped portion which projects into a corresponding recess of the valve accommodation 15 of the inlet valve 12 after the formation of the subassembly.

The valve unit 20 can be safely secured in the working chamber cover 6 e.g. by a screw coupling 22. Furthermore, the recess 19 is tightly closed by means of a valve flap 23 which is fastened at the working chamber cover unit 21 by a screw element 24.

The two inlet channels 11 of the two working chambers 7 are interconnected by way of channels 54 that extend in the pump housing 5 and open into a common port 25 in the pump housing 5 which, in turn, is connected through a vacuum hose (not shown) with a vacuum chamber of the brake booster (not shown), and the port 25 can be designed e.g. as an air intake fitting which is air-tightly fastened in or at the pump housing 5. Depending on the mounting conditions in the motor vehicle, this air intake fitting can have a straight or angled design and the air-tight attachment in or at the pump housing 5 can be rotatable or fixed.

As can be seen in FIGS. 2 and 3, according to the illustrated embodiment, an inlet channel 11 can split up towards the inlet valve 12 into several smaller inlet channels 26, which are arranged circularly around a center line A of the valve unit 20 and open into the working chamber 7 by means of one single channel 27.

Since the volume of the channel 27 belongs to the so-called detrimental volume, i.e. the residual volume remaining in the exhaust action, only one single channel 27 is provided in order to minimize the detrimental volume.

The working chamber 7, whose volume is very low in the illustrated position of the working diaphragm 4, i.e. preferably tends to zero, will increase upon rotation of the crank drive 8, with the result that the pressure in the working chamber 7 decreases to such a degree that part of the residual air existing in the vacuum chamber of the brake booster is aspirated into the working chamber 8 via the port 25 and the inlet channel 11. The valve disc 18 of the inlet valve 12 opens due to the aspiration action. Inlet valve 12 closes and outlet valve 14 opens when the working chamber 7 decreases due to continued rotation of the crank drive 8. As this occurs, the aspirated residual air is exhausted out of the working chamber 7 via the channel 27 and the outlet channel 13. As can be taken from FIG. 3 in particular, the outlet channel 13 is arranged in such a way in the working chamber cover 6 and in the pump housing 5 that the air displaced from the working chamber 7 is supplied into an inner space 28 of the pump housing 5.

An air outlet unit 29 provided in the pump housing 5 permits low-noise exhaust of the air out of inside space 28. The inside space 28, also referred to as crank chamber, serves as a sound absorbing chamber, hence. The air outlet unit 29 comprises a non-return valve 49 with a one-part or multi-part valve member 34, preventing return flow of already exhausted air and the ingress of fluid or gaseous substances into the crank chamber 28.

In addition, upon the exit of the air out of the inside space 28, the airborne sound is reduced because the air outlet unit 29 includes a filter 31 arranged in a filter housing 30, through which filter the air exits into the atmosphere. Furthermore, the air outlet unit 29 comprises an air outlet cover 32, an air outlet closing cap 33 and the valve member 34 and can be provided as a subassembly that can be pre-assembled. The air outlet cover 32, the air outlet closing cap 33 and the filter housing 30 are respectively attached with screw elements 35, 36, 37. For noise absorbing purposes, additional means can be provided with are favorably integrated into the subassembly air outlet unit 29.

When the air pressure in the inside space 28 of the pump 8 becomes higher than the atmospheric pressure encompassing the pump 2, the non-return valve 49 will open in that the valve member 34 lifts at least partly from through-bores 38 in the air outlet cover 32 and the air can escape from the pump housing 5 into the atmosphere through non-illustrated openings in the air outlet closing cap 33 and through the filter 31. Thus, on the one hand, the pressure in the inside space 28 of the pump 2 can rise in excess of the atmosphere only by the low differential pressure value which is required to open the non-return valve 49 and, on the other hand, the pressure in the inside space 28 undergoes periodic fluctuations in the cycle of the change in volume of the inside space which accompanies the crank movement. The result is a temporally averaged inside space pressure below the atmospheric pressure.

Further, it can be seen in FIG. 2 that a motor shaft 39 of the electric motor 3 is mounted in a first non-illustrated bearing arranged in motor 3 and in a second bearing 40, with the second bearing 40 being accommodated in part in a motor housing 41 and in part in the pump housing 5, and a motor shaft end 42 projects into the pump housing 5. An eccentric shaft 43 which is rigidly coupled to the motor shaft 39 carries the crank drive 8 with the eccentrics 9 and the connecting rods 10, with center lines M, E of the motor shaft 39 and the eccentric shaft 43 being in alignment with each other. There is no need for an additional mounting support of the motor shaft 39 or the eccentric shaft 43 in the pump housing 5 because the mentioned fixation of the second bearing 40 both in the motor housing 41 and in the pump housing 5 ensures already the necessary centering of the crank drive 8 inside the pump housing 5. It is possible as another embodiment to substitute an extension of the motor shaft 39 for the eccentric shaft 43, i.e. to provide motor and eccentric shafts 39, 43 in an integral design.

To ensure smooth running of the motor-and-pump assembly 1, central points of the eccentrics 9 in relation to the center line E of the eccentric shaft 43 are arranged diametrically as well as at an equal distance. As a result, the reaction forces of the oscillating masses of working diaphragms 4, connecting rods 10 and eccentrics 9 can almost be balanced since the common point of gravity stays in rest, at least in approximation, in each phase of their movement. The remaining insignificant deviation from an ideal mass balance is due to the fact that the two eccentrics 9, as is shown in FIG. 2, are arranged so as to be offset axially, while the working diaphragms 4 move at the same axial level.

Advantageously, the eccentrics 9 can be designed integrally as a double eccentric, which is arranged, for example, by a press fit on the eccentric shaft 43.

In another favorable design, the double eccentric is produced by press fitting the eccentric shaft 43 into two disc-shaped single eccentrics 9 which are twisted by 180° relative to each other.

It is advantageous for the simplified assembly of the motor-and-pump assembly 1 to join the eccentric shaft 43 and the motor shaft 39 inside the pump housing 5. To this end, the eccentric shaft 43 at its end close to the motor includes a screw coupling in the shape of an inside thread or an outside thread. To allow placing a tool for tightening the screw coupling, at least one tool contact surface is provided at the motor or at the free shaft end. It is also feasible for this purpose to provide the free end with a polygonal configuration.

It can be seen in FIG. 3 that the working diaphragm 4 separates the working chamber 7 from the crank chamber 28 and is rigidly connected to a tappet 45, and the tappet 45 which is preferably not deformable can be spray-coated by the elastically deformable material of the working diaphragm 4. As a result, a portion 50 that is hard to deform develops in the surroundings of the tappet 45 in the center of the working diaphragm 4, which portion in an outward direction passes over into an easily deformable portion 44 of the working diaphragm 4, with the latter in turn passing over in an outward direction into a diaphragm bead 51 that is rigidly and air-tightly connected to the pump housing 5. Tappet 45 in this embodiment is rigidly connected to the connecting rod 10 by way of a screw coupling. According to another embodiment, however, tappet 45 can be integral with the connecting rod 10. If tappet 45 and connecting rod 10 are provided as separate component parts, they are welded or screwed to each other depending on the material of the components parts.

The connecting rods 10 are movably mounted on the eccentrics 9 by means of ball bearings 46.

In order to maintain a very low residual volume in the working chamber 7, the working chamber cover 6 has a three-dimensional shape which is adapted to the envelope of a diaphragm surface 52 close to the working chamber that is induced by the tilting movement of the tappet 45 moved by the crank drive 8. Preferably, the three-dimensional inside contour of the working chamber cover is adapted to the envelope by maintaining a predefined small distance between the areas of the hardly deformable portion 50 of the working diaphragm 4 and the working chamber cover 6, while the distance in the areas of the easily deformable portion 44 of the working diaphragm 4 and the diaphragm bead 51 to the working chamber cover 6 is chosen to be zero. The small distance between the working chamber cover inside contour and the envelope of the diaphragm surface 52 close to the working chamber in the central area of the working diaphragm 4 prevents abutment thereof on the working chamber cover 6 during operation of the pump 2 and allows an air flow between the working chamber 7 and the channel 27 in the working chamber cover 6 also in the top dead center of the crank drive 8.

Furthermore, means are provided in order to adjust the distance of the working chamber cover 6 from the working diaphragm 4, whereby manufacturing tolerances or assembly tolerances are compensated. It is provided to perform the adjustment during the final assembly of the motor-and-pump assembly 1.

In an embodiment, the spacing adjustment means are formed of an adjustable connection between connecting rod 10 and tappet 45. One example of such a connection is a welded joint. Another example involves a screw coupling with inlaid washers.

In another embodiment, the spacing adjustment means represent an adjustable connection between pump housing 5 and working chamber cover 6. One example for such an adjustable connection is a welded joint, another example is a screw coupling between pump housing 5 and working chamber cover 6 where the tightening moment of the connecting screws is used to determine the compression deformation of the diaphragm edge which is designed as a diaphragm bead 51 for this purpose.

A weight-optimized assembly 1 is obtained in that the pump housing 5 and the working chamber cover 6 are made of plastics, for example, by injection molding, and the component parts are interconnected preferably by ultrasonic welding. Besides, the pump housing 5 and the working chamber cover 6 or only the pump housing 5 can be made of aluminum because aluminum allows good heat dissipation from motor 3. Thus, a material combination of plastics and aluminum is possible for the two component parts pump housing 5 and working chamber cover 6.

Favorably, the inlet and outlet channels 11, 13 are positioned in the pump housing 5 in such a fashion that the two working chamber covers 6 can be designed identically. In this context, the working chamber covers 6 and the pump housing 5 include means for the defined positioning of the working chamber covers 6 on the pump housing 5 in order to facilitate the assembly and prevent faulty positioning.

To render the means for the defined positioning more precise, an unsymmetrical joining contour as well as projections in the connecting surface can be provided. An unsymmetrical perforated pattern is advisable as a positioning means when coupling working chamber cover 6 and pump housing 5 by screws.

Flow channels which extend through the connecting surface between working chamber cover 6 and pump housing 5 are designed in the transitions between working chamber cover 6 and pump housing 5 so as to be gas-tight towards their environment, for example, by the use of sealing elements 47 by means of a gas-tight welding joint.

The above-described air outlet unit 29, basically consisting of filter housing 30, filter 31, valve cover 32, valve closing cap 33 and valve member 34, is designed as a pre-assembled unit and destined for installation into an aperture 48 of a wall 53 of the pump housing 5 that is remote from motor 3. As can be seen, the abutment of the e.g. disc-shaped valve member 34 on the valve cover 32 is achieved by means of the valve closing cap 33. In this context, the aperture 48 prior to the installation of the air outlet unit 28 performs the function of a mounting window which allows access to the inside space 28 of the pump housing 5.

The outlet channels 13 open into the inside space 28 of the pump housing 5 so that the latter is used as an acoustic absorbing space for diminishing the exiting sound when air is exhausted out of the working chambers 7.

The motor-and-pump assembly 1 according to aspects of the invention is mounted with the following working steps:
1. Pre-assembling the subassemblies motor 3, working chamber cover units 21 and air outlet unit 29;
2. Pre-assembling the eccentric shaft 43 with the double eccentric 9, composed of the two eccentrics 9 offset by 180 degrees and carrying ball bearings 46, the motor-end connecting rod 10 and a first working diaphragm 4 associated with the motor-end connecting rod 10;
3. Connecting the subassembly with the motor 3 produced in step 2 by connecting the eccentric shaft 43 with the motor shaft 39, this working step taking place inside the pump housing 5. The openings of the pump housing 5 provided for the accommodation of the air outlet unit 29 and the second working diaphragm 4 are used as mounting windows for this purpose;
4. Connecting the second connecting rod 10 to the second working diaphragm 4;
5. Inserting the subassembly produced in step 4 into the pump housing 5;
6. Mounting the second connecting rod 10 onto the ball bearing 46 of the eccentric 9 close to the air outlet;
7. Attaching the motor 3 to the pump housing 5;
8. Connecting the working chamber cover units 21 to the pump housing 5;
9. Closing the aperture 48 by means of the air outlet unit 29.

Figure 4:
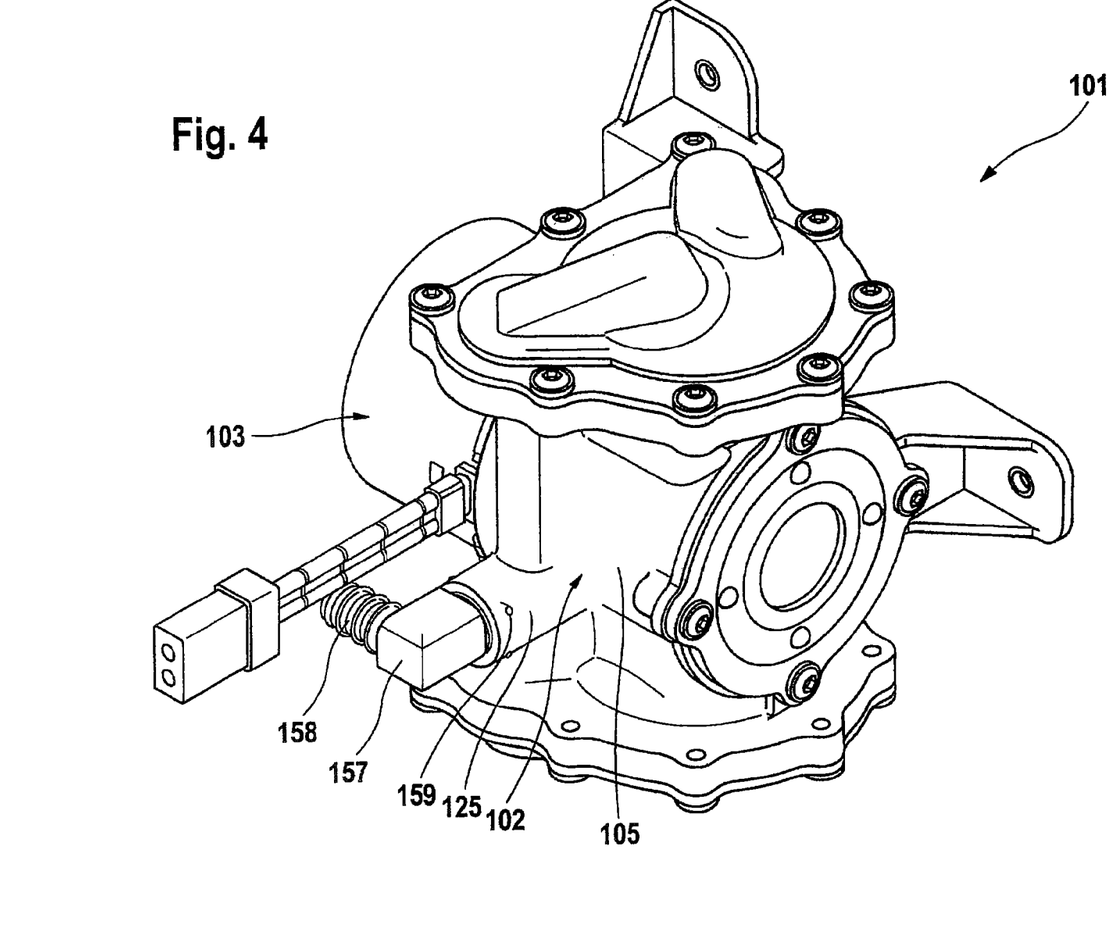
FIG. 4 is a three-dimensional view of a second embodiment of a motor-and-pump assembly according to aspects of the invention.
Figure 5:
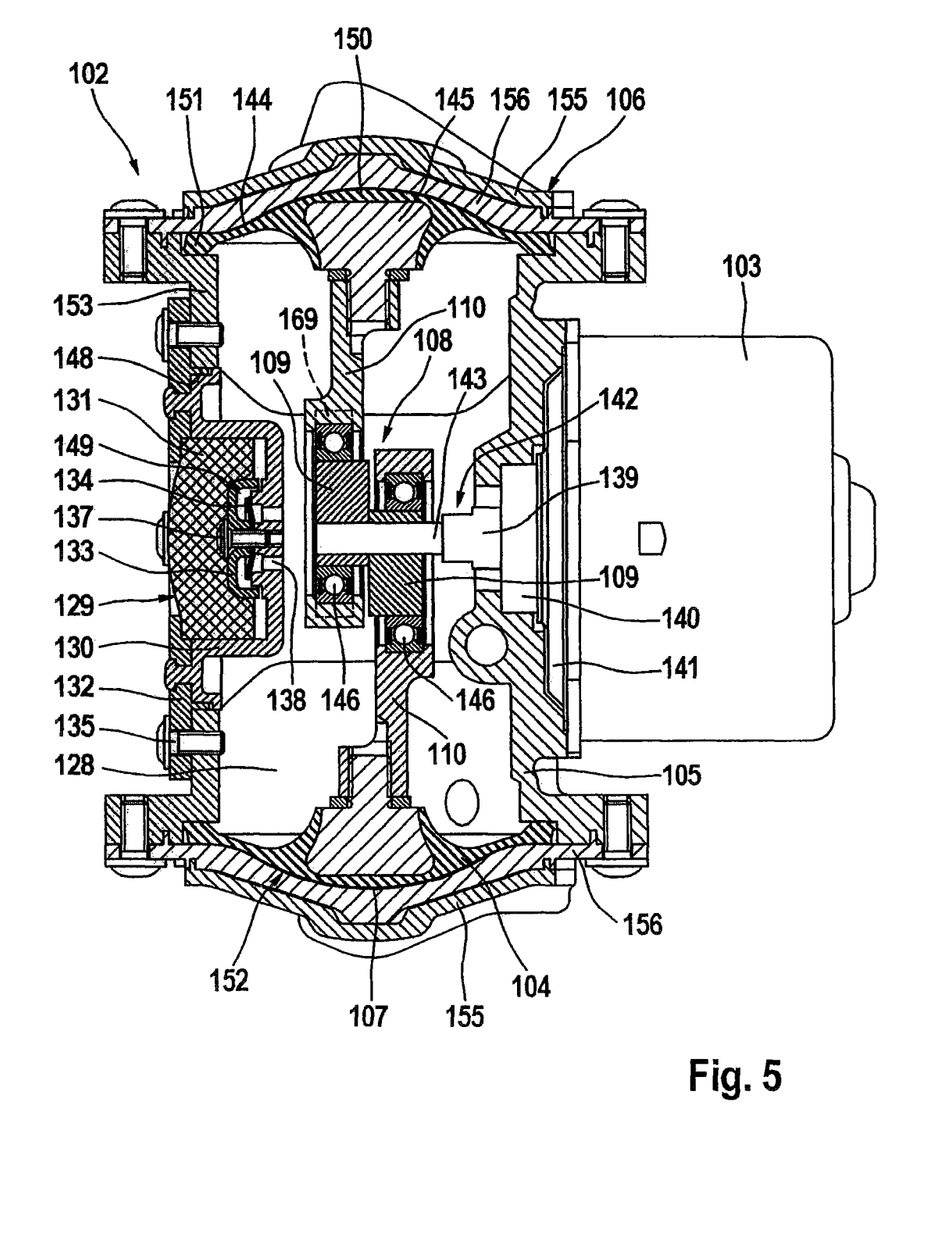
FIG. 5 shows the motor-and-pump assembly according to FIG. 4 in a longitudinal cross-section taken through a first plane.
Figure 6:
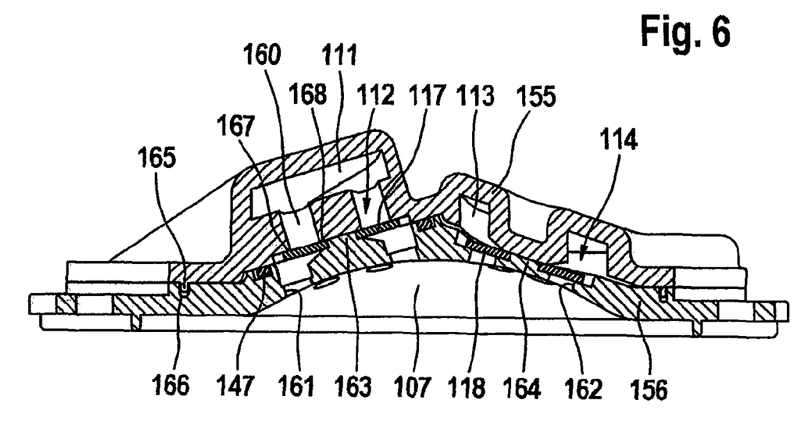
FIG. 6 shows a working chamber cover of the motor-and-pump assembly according to FIG. 4 in a longitudinal cross-section taken through a second plane.

FIGS. 4 to 6 show a second embodiment of a motor-and-pump assembly 101. The design and the function are largely identical with the first embodiment so that like component parts or component parts with like functions exhibit like reference numerals raised by 100.

FIG. 4 is a three-dimensional view of the second embodiment of the motor-and-pump assembly 101, which comprises a pump 102 with a pump housing 105 and an electric motor 103 driving the pump 102, and the motor 103 can be designed as a direct-current motor, for example.

As is apparent from FIG. 5 in particular, which shows the motor-and-pump assembly 101 in a longitudinal cross-section taken through a first plane, the pump 102 is provided as a double diaphragm pump with two opposed working diaphragms 104, being compressed in each case between the pump housing 105 and a working chamber cover 106 and thereby delimiting a working chamber 107. The working diaphragms 104 are movable in opposite directions by means of a crank drive 108 which comprises an eccentric 109 and a connecting rod 110 per working diaphragm 104.

FIG. 6 is a cross-sectional view of the working chamber cover 106 of the motor-and-pump assembly 101. It is apparent that the working chamber cover 106 includes an upper lid 155 and a lower lid 156 which, depending on the material, i.e. plastics or aluminum, are welded or screwed to each other in an air-tight manner. The upper lid 155 is centered on the lower lid 156 e.g. by a welding addition 165, which engages a corresponding contour 166 when the upper lid 155 is mounted.

Provided at the pump housing 105 is a port 125 shown in FIG. 4 with an adapter 157 which is fastened in a sealing manner therein and through which the connected brake booster is evacuated. The adapter 157 can have an angled-off design as shown, for example. To comply with customers' requests, a straight adapter 157 is, however, also possible. Furthermore, the design of an adapter outlet 158 to which a vacuum hose (not shown) is attached is different depending on the type of connection. Thus, a snap closure or lock-type closure is possible apart from the illustrated pine tree profile.

The adapter 157 can be positioned either in the port 125 by means of locking engagement, or the port-adapter connection is provided so as to be rotatable. The rotatable embodiment of the connection can, e.g., be by means of pin-shaped elements 159 which project into bores of the port 125 and engage into an outside groove of the adapter 157 that is not visible.

The port 125 opens into a non-illustrated housing bore which branches into two channels provided in the pump housing 105 and leading to the two working chamber covers 106. It is thereby possible to provide the working chamber covers 106 with an equal design for both sides of the pump 102, thereby simplifying the assembly considerably. Favorably, a second port 125 can be provided on the opposite side of the pump housing 105. It is thus possible to connect the adapter 157 either at the one or at the opposite side, depending on the customer's request and the installation conditions of the motor-and-pump assembly 101. For this purpose, one of the ports 125 can be tightly closed by means of a plug. It is also feasible that one of the ports 125 remains closed during the manufacture and will only be opened by boring, for example, in case of need.

An inlet channel 111 provided in the upper lid 155 exists in each of the working chamber covers 106, the said channel being air-tightly connected to the mentioned pump housing channel by means of a sealing element and conveying the aspirated air to an inlet valve 112. Inlet valve 112 is preferably designed as a plate valve with a valve disc 117 made of elastic material. The total cross-sectional area of orifice to be covered by the elastomeric valve disc 117 is expediently split up into several small cross-sectional areas of orifice with a circular cross-section in each case. To this end, the inlet channel 111 in the upper lid 155 branches into a corresponding number of single channels 160 which are circularly arranged around a center line of the inlet valve 111.

After passage through the inlet valve 112, the aspirated air propagates through working chamber cover openings 161 in the lower lid 156 into the working chamber 107 between diaphragm 104 and working chamber cover 106, where it is compressed and led through additional working chamber cover openings 162 to the outlet valve 114, which is also designed as a plate valve with a valve disc 118 made of elastomeric material. As can be seen, an outlet channel 113 is designed between upper lid 155 and lower lid 156.

To maintain the working chamber 107 with a very low residual volume, the working chamber cover 6 in this embodiment, too, has a three-dimensional shape which is adapted to the envelope of a diaphragm surface 152 close to the working chamber that is induced by the tilting movement of the tappet 145 moved by the crank drive 108. Preferably, the three-dimensional inside contour of the working chamber cover is adapted to the envelope by maintaining a predefined small distance between the areas of a hardly deformable portion 150 of the working diaphragm 104 and the working chamber cover 106, while the distance in the areas of an easily deformable portion 144 of the working diaphragm 104 and a diaphragm bead 151 is chosen to be zero. The small distance between the working chamber cover inside contour and the envelope of the diaphragm surface 152 close to the working chamber in the central area of the working diaphragm 104 prevents abutment thereof on the working chamber 106 during operation of the pump 102 and allows an air flow between the working chamber 107 and the working chamber cover openings 161, 162 also in the top dead center of the crank drive 108.

The working chamber cover openings 161, 162 belong to the so-called detrimental volume, i.e. the residual volume that remains in the exhaust action. The air under atmospheric pressure that remains therein expands in the aspiration process, whereby less volume can be aspirated. It is therefore suitable to provide the working chamber cover openings 161, 162 with the least possible volume.

Therefore, inlet and outlet valves 112, 114 are arranged tangentially relative to the inside contour of the working chamber cover, i.e., crossly to the planes of symmetry of pump 102, and the working chamber cover openings 161, 162 are configured as short bores. This design of the working chamber covers 106 necessitates small mounting space what is considered another advantage.

The exhausted air is conducted from the outlet valve 114 through the outlet channel 113 in the working chamber cover 106 to an outlet channel (not shown) in the pump housing 105. The outlet channels 113 in the working chamber cover 106 and pump housing 105 are air-tightly interconnected by means of a sealing element. The two outlet channels in the pump housing 105 open into an inside space 128 of the pump housing 105, the so-called crank chamber.

To facilitate the mounting of the valve discs 117, 118, the lower lid 156 includes each one positioning pin 163, 164 in the area of the valves 112, 114, which pin is used to guide the valve discs 117, 118.

The inlet valve 112 further includes two coaxial circular sealing surfaces 167, 168 provided at the upper lid 155, being designed as circumferential projections, with one sealing surface 167 being arranged outside the single channels 160 and one sealing surface 168 being arranged inside the single channels 160. This decrease of the sealing surface achieves a greater sealing effect, and the valve disc 117 is prevented from sticking at the upper lid 155, especially at low temperatures.

An air outlet unit 129 provided in the pump housing 105 allows a low-noise exhaust of the air out of the inside space 128. The inside space 128, also referred to as crank chamber, is hence used as a sound absorbing space. As has already been described with regard to the first embodiment, the air outlet unit 129 has a non-return valve 149 comprising a one-part or multi-part valve member 134, which prevents return flow of already expelled air as well as the ingress of fluid or gaseous substances into the crank chamber 128.

In addition, the air-borne sound is diminished upon the exit of the air out of the inside space 128 in that the air outlet unit 129 includes a filter 131 arranged in a filter housing 130, through which the air exits into the atmosphere. Furthermore, the air outlet unit 129 comprises an air outlet cover 132, an air outlet closing cap 133 as well as the valve member 134 and can be provided as a pre-assembled subassembly. The air outlet cover 132, the air outlet closing cap 133 and the filter housing 130 are respectively attached by means of screw elements 135, 137. As can be seen, the filter housing 130 is riveted to the air outlet cover 132. Additional means can be provided for noise attenuation, which are favorably integrated into the subassembly air outlet unit 129.

When the air pressure in the inside space 128 of the pump becomes higher than the atmospheric pressure encompassing the pump, the non-return valve 149 will open in that the valve member 134 lifts at least partly from through-bores 138 in the air outlet cover 132, and the air can escape from the pump housing 105 into the atmosphere through non-illustrated openings in the air outlet closing cap 133 and through the filter 131. Thus, on the one hand, the pressure in the inside space 128 of the pump 102 can only rise in excess of the atmosphere pressure by the low differential pressure value which is required to open the non-return valve 149 and, on the other hand, the pressure in the inside space 128 undergoes periodic fluctuations in the cycle of the change in volume of the inside space which accompanies the crank movement. The result is a temporally averaged inside space pressure below the atmospheric pressure.

Further, it can be seen in FIG. 5 that a motor shaft 139 of the electric motor 103 is mounted in a first non-illustrated bearing arranged in motor 3 and in a second bearing 140, with the second bearing 140 being accommodated in part in a motor housing 141 and in part in the pump housing 105. This achieves a favorable centering of motor 103 and pump 102. The motor 103 is fastened at the pump housing 105 by means of screw elements (not shown) which engage into threaded seats in the pump housing 105 when the pump housing 105 is made of plastics.

The motor shaft 139 in this embodiment additionally serves as an eccentric shaft 143 which carries the crank drive 108 with the eccentrics 109 and the connecting rods 110. However, a separate design of motor shaft 139 and eccentric shaft 143 as has been described according to the first embodiment is, however, also possible.

To ensure smooth running of the motor-and-pump assembly 101, central points of the eccentric 109 in relation to a center line of the motor shaft 139 are arranged diametrically and at an equal distance, i.e. the eccentrics 109 are offset by 180°. As a result, the reaction forces of the oscillating masses of working diaphragms 104, connecting rods 110 and eccentrics 109 can almost be balanced since the common point of gravity stays in rest, at least in approximation, in each phase of their movement. The remaining insignificant deviation from an ideal mass balance is due to the fact that the two eccentrics 109, as is shown in FIG. 5, are arranged so as to be offset axially, while the working diaphragms 104 move at the same axial level.

For example, the eccentrics 109 can also be offset by 90° in relation to each other, with the offset by 90° producing a lower torque and, thus, having positive effects on the development of noise as well as start of operation of pump 102.

It can further be seen in FIG. 5 that the working diaphragm 104 separates the working chamber 107 from the crank chamber 128 and is rigidly connected to the tappet 145, and the tappet 145 which is preferably not deformable can be spay-coated by the elastically deformable material of the working diaphragm 104. As a result, the above-mentioned hardly deformable portion 150 in the center of the working diaphragm 104 develops in the surroundings of the tappet 145, which portion in an outward direction passes over into an easily deformable portion 144 of the working diaphragm 104, with the latter in turn passing over in an outward direction into a diaphragm bead 151 that is rigidly and air-tightly connected to the pump housing 105. Tappet 145 can be rigidly connected to the connecting rod 110 by way of a welded joint or a screw coupling. However, said tappet can be integral with the connecting rod 110 as well. The connecting rods 110 are movably mounted on the eccentrics 109 by means of ball bearings 146.

Figure 7:
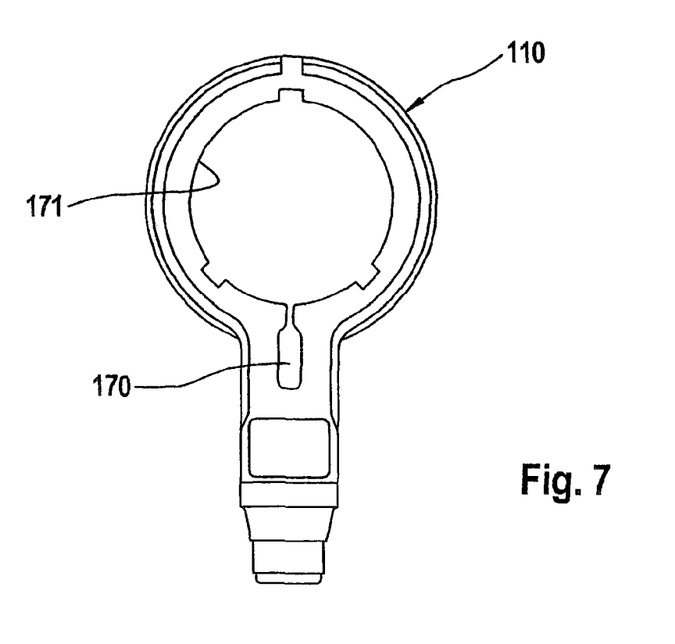
FIG. 7 is another embodiment of a connecting rod of a motor-and-pump assembly according to the invention.

When the connecting rods 110 are made of plastics, injection-molded prop rings 169 in the area of a connecting rod eye 171 can stabilize the seat of the ball bearing 146 in the connecting rods 110. Alternatively, slots 170 shaped into the connecting rods 110 in the area of the connecting rod eye 171 can resiliently enclose the ball bearings 146, as can be taken from FIG. 7 which shows another embodiment of a connecting rod 110.

In this embodiment, too, means are provided in order to adjust the distance of the working chamber covers 106 from the working diaphragm 104, whereby manufacturing tolerances of assembly tolerances are compensated. It is arranged to perform the adjustment during the final assembly of the motor-and-pump assembly 101.

In an embodiment, the spacing adjustment means are formed of an adjustable connection between connecting rod 110 and tappet 145. One example of such a connection is a welded joint. Another example involves a screw coupling with inlaid washers.

Another embodiment arranges also in this example for the spacing adjustment means to be an adjustable connection between pump housing 105 and working chamber 106. One example for such an adjustable connection is a welded joint, another example is a screw coupling between pump housing 105 and working chamber cover 106, where the tightening moment of the connecting screws is used to determine the compression deformation of the diaphragm edge which is designed as a diaphragm bead 151 for this purpose.

A weight-optimized assembly 101 is obtained in that the pump housing 105 and the working chamber covers 106 are made of plastics, for example, by injection molding, and single injection-molded component parts are interconnected preferably by ultrasonic welding. Besides, the pump housing 105 and the working chamber cover 106 or only the pump housing 105 can be made of aluminum because aluminum allows good heat dissipation from motor 103. Thus, a material combination of plastics and aluminum is possible for the two component parts.

Favorably, the inlet and outlet channels 111, 113 are positioned in the pump housing 105 in such a fashion that the two working chamber covers 106 can be designed identically. In this context, the working chamber covers 106 and the pump housing 105 include means for the defined positioning of the working chamber covers 106 on the pump housing 105 in order to facilitate the assembly and prevent faulty positioning.

To render the means for the defined positioning more precise, an unsymmetrical joining contour as well as projections in the connecting surface can be provided. An unsymmetrical perforated pattern is advisable as a positioning means when coupling working chamber cover 106 and pump housing 105 by screws.

Flow channels which extend through the connecting surface between working chamber cover 106 and pump housing 105 are designed in the transitions between working chamber cover 106 and pump housing 105 so as to be gas-tight towards their environment, for example, by the use of sealing elements 147 by means of a gas-tight welding operation.

The above-described air outlet unit 129, basically consisting of filter housing 130, filter 131, valve cover 132, valve closing cap 133 and valve member 134, is designed as a pre-assembled unit and destined for installation into an aperture 148 of a wall 153 of the pump housing 105 that is remote from motor 103. As can be seen, the abutment of the e.g. disc-shaped valve member 134 on the valve cover 132 is achieved by means of the valve closing cap 133. In this context, the aperture 148, prior to the installation of the air outlet unit 129, performs the function of a mounting window which allows access to the inside space 128 of the pump housing 105.

The outlet channels 113 open into the inside space 128 of the pump housing 105 so that the latter is used as an acoustic absorbing space for diminishing the exiting sound when air is exhausted out of the working chambers 107.

According to an aspect of the invention, the motor-and-pump assembly 1 is mounted in accordance with the following working steps:
1. Pre-assembling the subassemblies motor 103 and air outlet unit 129;
2. Installing the motor 103 into the pump housing 105;
3. Mounting the double eccentrics 109, formed of the two eccentrics 109 being offset by 180° in relation to each other and carrying ball bearings 146, the motor-end connecting rod 110 and a first working diaphragm 104 associated with the motor-end connecting rod 110, with this working step being carried out inside the pump housing 105. The openings of the pump housing 105 provided for the accommodation of the air outlet unit 129 and the second working diaphragm 104 are used as mounting windows for this purpose;
4. Connecting the second connecting rod 110 to the second working diaphragm 104;
5. Inserting the subassembly produced in step 4 into the pump housing 105;
6. Mounting the second connecting rod 110 onto the ball bearing 146 of the eccentric 109 close to the air exit;
7. Attaching the motor 103 to the pump housing 105; and
8. Closing the aperture 148 by means of the air outlet unit 129.

The motor-and-pump assemblies 1, 101 which have been described in the embodiments are actuated by an electronic control unit (ECU) (not shown) depending on a signal of a sensor, which detects a difference in pressure between the vacuum chamber and a working chamber or the absolute pressure in the vacuum chamber of the brake booster. In this context, the motor-and-pump assembly 101 is switched on when the signal falls below a first defined bottom value and is switched off when the signal exceeds a second defined top value. The control unit can be integrated into an electronic control unit ECU, for example the one of the brake system, or can be provided as a separate control unit.

In order to safeguard the evacuation of the vacuum chamber of the brake booster which is required to achieve brake boosting even if parts of the actuation unit such as the electronic control unit fail, provisions are made to execute the actuation in such a fashion that the motor-and-pump assembly 1, 101 is fully energized when the vehicle is activated ('ignition on') and the electronic control unit is inactive.

The motor-and-pump assemblies 1, 101 are especially employed in motor vehicles with vacuum brake booster and are a substitute for the previously customary vacuum supply by means of volumetric displacement of a vacuum pump driven by the internal combustion engine. This change in technology is based on the following points:

Modern internal combustion engines can supply less or no displaced volume because the construction engineers of internal combustion engines aim at reducing throttle losses and, therefore, decrease the vacuum level and because the secondary air introduced via the vacuum port into the induction tract disturbs the exhaust-gas control of the internal combustion engine.

The internal combustion engines with direct injection which are more widely spread in usage do not produce vacuum due to their principle and are therefore equipped with vacuum pumps in prior art which are directly driven by the internal combustion engine, with these vacuum pumps being mostly connected to a camshaft.

A vacuum pump that is directly driven by the internal combustion engine causes permanent loss in power as long as the internal combustion engine is running, even when the vacuum has already reached the required level. It is more favorable under energetic aspects to drive a vacuum pump electrically and to switch it off when the desired vacuum level is reached.

Operating conditions develop in hybrid vehicles equipped with an electric motor and an internal combustion engine in which the internal combustion engine is inactive and does not supply vacuum for the brake booster, therefore requiring a motor-and-pump assembly 1.

In pure electric vehicles, electric energy is available as the sole energy source for producing vacuum.

The motor-and-pump assemblies 1, 101 described hereinabove are not restricted to the described case of application of the provision of vacuum. Assemblies 1, 101 of this type can be employed in all cases where the objective is to bring gases with high efficiency and low noise emissions from a first pressure level to a higher second pressure level. For example, use of the assembly 1, 101 as a compressor is also feasible. Preferably, the installation direction of the valves is reversed in this application so that the aspiration of the air out of the inside space 28, 128 of the pump housing 5, 105 and the discharge of compressed air takes place by way of port 25, 125.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A motor and pump assembly for providing pressure to a brake actuating device of a motor vehicle brake system, said assembly comprising:
   an electric motor;
   a double diaphragm pump including a pump housing, two opposed working diaphragms, and crank drives each being coupled between the electric motor and a respective diaphragm for moving the respective diaphragm, said crank drives capable of being driven by the electric motor, each diaphragm of the pump being compressed between the pump housing and a working chamber cover thereby delimiting a working chamber defined between the pump housing and the working chamber cover, each working chamber including an inlet channel, an inlet valve associated with the inlet channel, an outlet channel, and an outlet valve associated with the outlet channel, wherein the outlet channels are defined in the covers of the working chamber and in the pump housing to direct air displaced from the working chambers into an inside space of the pump housing; and
   an air outlet unit for exhausting the air from the inside space,
   wherein the air outlet unit includes means for absorbing sound and the crank drive includes eccentrics and connecting rods.

2. The motor and pump assembly as claimed in claim 1, wherein the air outlet unit comprises a filter housing, a filter, an air outlet cover, an air outlet closing cap and a valve member and is provided as a subassembly which can be pre-assembled.

3. The motor and pump assembly as claimed in claim 2, wherein the air outlet cover, the air outlet closing cap and the valve member form a non-return valve.

4. The motor and pump assembly as claimed in claim 2, wherein the filter housing, the air outlet closing cap and the valve member form a non-return valve.

5. The motor and pump assembly as claimed in claim 2, wherein the filter housing is riveted to the air outlet cover.

6. The motor and pump assembly as claimed in claim 2, wherein the air outlet cover is fastened to the wall by a fastener.

7. The motor and pump assembly as claimed in claim 1, wherein the two inlet channels are interconnected through channels formed in the pump housing and have one common port.

8. The motor and pump assembly as claimed in claim 7, wherein the common port includes means for fastening a hose.

9. The motor and pump assembly as claimed in claim 7, wherein the common port is an air intake fitting.

10. The motor and pump assembly as claimed in claim 7, further comprising an adapter fastened to the common port in a sealing manner, wherein the adapter includes an adapter exit having means for attaching a hose.

11. The motor and pump assembly as claimed in claim 10, wherein the adapter can be positioned in the port by means of locking engagement.

12. The motor and pump assembly as claimed in claim 11, wherein the adapter is arranged in the port so as to be rotatable by means of pin-shaped elements, said pin-shaped elements engaging into an outside groove of the adapter.

13. The motor and pump assembly as claimed in claim 1, wherein the pump housing is formed from either plastic or aluminum.

14. The motor and pump assembly as claimed in claim 1, wherein the working chamber cover is formed from either plastic or aluminum.

15. The motor and pump assembly as claimed in claim 1, wherein the inlet valve and the outlet valve of a working chamber are provided as a valve unit that can be pre-assembled.

16. The motor and pump assembly as claimed in claim 15, wherein the valve unit can be integrated into the working chamber cover and together with it form a working chamber cover unit.

17. The motor and pump assembly as claimed in claim 1, wherein the working chamber cover includes an upper lid and a lower lid which are interconnected in a sealing fashion, with the valves being provided between the upper lid and the lower lid.

18. The motor and pump assembly as claimed in claim 17, wherein the upper lid is welded or fastened to the lower lid.

19. The motor and pump assembly as claimed in claim 1, wherein the inlet channel is provided in the upper lid and the outlet channel is provided between the upper lid and the lower lid.

20. The motor and pump assembly as claimed in claim 1, wherein the inlet channel in the area of the inlet valve splits into several single channels being arranged circularly around a center line of the inlet valve.

21. The motor and pump assembly as claimed in claim 1, wherein the inlet valve and the outlet valve are arranged orthogonal to an axis of symmetry of the pump.

22. The motor and pump assembly as claimed in claim 17, wherein the valves are provided as plate valves with a valve disc.

23. The motor and pump assembly as claimed in claim 22, wherein positioning pins are provided in the lower lid in order to position valve discs.

24. The motor and pump assembly as claimed in claim 17, wherein the lower lid includes working chamber cover openings corresponding to the inlet valve and the outlet valve, and the working chamber cover openings are substantially aligned with the center line of the respective valves.

25. The motor and pump assembly as claimed in claim 1, wherein the working chamber covers have an identical design.

26. The motor and pump assembly as claimed in claim 1, further comprising spacing adjustment means for adjusting the distance between the working chamber covers and the working diaphragm.

27. The motor and pump assembly as claimed in claim 26, wherein the spacing adjustment means are provided by an adjustable connection between a connecting rod and a tappet linked to the working diaphragm.

28. The motor and pump assembly as claimed in claim 1, further comprising spacing adjustment means for adjusting the distance between the working chamber covers and the pump housing.

29. The motor and pump assembly as claimed in claim 28, wherein the spacing adjustment means are provided by a welded joint.

30. The motor and pump assembly as claimed in claim 28, wherein the spacing adjustment means are provided by a screw coupling between the working chamber cover and the pump housing.

31. The motor and pump assembly as claimed in claim 1, wherein a motor shaft of the electric motor is mounted in a first bearing arranged in the motor and in a second bearing, with the second bearing being accommodated in part in a motor housing and in part in the pump housing, and a motor shaft end projects into the pump housing.

32. The motor and pump assembly as claimed in claim 31, wherein the crank drive is arranged on the motor shaft.

33. The motor and pump assembly as claimed in claim 32, wherein the crank drive is arranged on an eccentric shaft that is connected to the motor shaft by means of a screw coupling, with the axes of rotation of the motor shaft and the eccentric shaft being substantially in alignment with each other.

34. The motor and pump assembly as claimed in claim 33, wherein central points of two eccentric portions of the eccentric shaft are arranged diametrically in relation to an axis of rotation of either the motor shaft or the eccentric shaft.

35. The motor and pump assembly as claimed in claim 34, wherein the eccentric portions of the eccentric shaft are integrated.

36. The motor and pump assembly as claimed in claim 1, wherein the pump housing and the working chamber covers include means for positioning the working chamber covers onto the pump housing.

37. The motor and pump assembly as claimed in claim 1, wherein the motor and pump assembly is actuated by an electronic control unit (ECU), said ECU actuating said assembly as a function of a signal of a sensor that detects a difference in pressure between a vacuum chamber of the brake actuating device and the working chamber or an absolute pressure in the vacuum chamber of the brake actuating device.

38. The motor and pump assembly as claimed in claim 1, wherein the connecting rods in an area of a connecting rod eye include injection-molded prop rings in order to stabilize ball bearings.

39. The motor and pump assembly as claimed in claim 38, wherein the connecting rods include a slot in the area of the connecting rod eye.

40. A motor vehicle brake system including the motor-and-pump assembly of claim 1.

41. The motor and pump assembly as claimed in claim 1, wherein the air outlet unit for exhausting the air from the inside space operates at low noise.

42. The motor and pump assembly as claimed in claim 1, wherein the brake actuating device is a pneumatic brake booster.

43. The motor and pump assembly as claimed in claim 42, wherein the pneumatic brake booster is a vacuum brake booster.

44. The motor and pump assembly comprising:
an electric motor;
a double diaphragm pump including a pump housing, two opposed working diaphragms, and crank drives each being coupled between the electric motor and a respective diaphragm for moving the respective diaphragm, said crank drives capable of being driven by the electric motor, each diaphragm of the pump being compressed between the pump housing and a working chamber cover thereby delimiting a working chamber defined between the pump housing and the working chamber cover, each working chamber including an inlet channel, an inlet valve associated with the inlet channel, an outlet channel, and, an outlet valve associated with the outlet channel, wherein the outlet channels are defined in the covers of the working chamber and in the pump housing to direct air displaced from the working chambers into an inside space of the pump housing; and
an air outlet unit for exhausting the air from the inside space,
wherein the air outlet unit closes an aperture of a wall of the pump housing in a sealing manner.

45. The motor and pump assembly comprising:
an electric motor
a double diaphragm pump including a pump housing, two opposed working diaphragms, and crank drives each being coupled between the electric motor and a respective diaphragm for moving the respective diaphragm, said crank drives capable of being driven by the electric motor, each diaphragm of the pump being compressed between the pump housing and a working chamber cover thereby delimiting a working chamber defined between the pump housing and the working chamber cover, each working chamber including an inlet channel, an inlet valve associated with the inlet channel, an outlet channel, and an outlet valve associated with the outlet channel, wherein the outlet channels are defined in the covers of the working chamber and in the pump housing to direct air displaced from the working chambers into an inside space of the pump housing; and an air outlet unit for exhausting the air from the inside space, wherein the pump housing includes two opposed ports, and one port is closed.

* * * * *

UNITED STATES PATENT AND TRADEMARK OFFICE
CERTIFICATE OF CORRECTION

PATENT NO.        : 8,702,180 B2
APPLICATION NO.   : 12/278647
DATED             : April 22, 2014
INVENTOR(S)       : Rüffer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1655 days.

Signed and Sealed this
Twenty-ninth Day of September, 2015

Michelle K. Lee
*Director of the United States Patent and Trademark Office*